US010366173B2

(12) United States Patent
Kim et al.

(10) Patent No.: US 10,366,173 B2
(45) Date of Patent: Jul. 30, 2019

(54) DEVICE AND METHOD OF SIMULTANEOUS INTERPRETATION BASED ON REAL-TIME EXTRACTION OF INTERPRETATION UNIT

(71) Applicant: Electronics and Telecommunications Research Institute, Daejeon (KR)

(72) Inventors: Chang Hyun Kim, Daejeon (KR); Young Kil Kim, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/700,537

(22) Filed: Sep. 11, 2017

(65) Prior Publication Data

US 2018/0075023 A1    Mar. 15, 2018

(30) Foreign Application Priority Data

Sep. 9, 2016   (KR) .................. 10-2016-0116529
Sep. 8, 2017   (KR) .................. 10-2017-0115412

(51) Int. Cl.
*G10L 15/16*    (2006.01)
*G06F 17/28*    (2006.01)
(Continued)

(52) U.S. Cl.
CPC .......... *G06F 17/289* (2013.01); *G06F 17/211* (2013.01); *G06F 17/2775* (2013.01);
(Continued)

(58) Field of Classification Search
CPC ....... G10L 15/197; G10L 15/02; G10L 15/04; G10L 15/063; G10L 15/14; G10L 15/16;
(Continued)

(56) References Cited

U.S. PATENT DOCUMENTS 8,990,126 B1 * 3/2015 Bangalore ............. G06F 17/211
706/12
9,558,454 B2 * 1/2017 Strassner ............. G06N 99/005
(Continued)

FOREIGN PATENT DOCUMENTS

JP    2009-210879    9/2009
KR    10-2002-0076044    10/2002
(Continued)

*Primary Examiner* — Vijay B Chawan
(74) *Attorney, Agent, or Firm* — Kile Park Reed & Houtteman PLLC

(57) ABSTRACT

The present invention relates to a device of simultaneous interpretation based on real-time extraction of an interpretation unit, the device including a voice recognition module configured to recognize voice units as sentence units or translation units from vocalized speech that is input in real time, a real-time interpretation unit extraction module configured to form one or more of the voice units into an interpretation unit, and a real-time interpretation module configured to perform an interpretation task for each interpretation unit formed by the real-time interpretation unit extraction module.

16 Claims, 4 Drawing Sheets

(51) Int. Cl.
*G10L 15/26* (2006.01)
*G10L 15/10* (2006.01)
*G06F 17/21* (2006.01)
*G06F 17/27* (2006.01)
*G10L 15/04* (2013.01)
G10L 25/78 (2013.01)
G06F 3/0481 (2013.01)
G10L 15/18 (2013.01)

(52) U.S. Cl.
CPC .............. *G10L 15/04* (2013.01); *G10L 15/10* (2013.01); *G10L 15/26* (2013.01); *G06F 3/0481* (2013.01); *G10L 15/16* (2013.01); *G10L 15/18* (2013.01); *G10L 25/78* (2013.01)

(58) Field of Classification Search
CPC ....... G10L 15/26; G10L 25/78; G06F 17/276; G06F 17/2785; G06F 17/30867; G06F 17/211; G06F 17/27; G06F 17/289; G06F 17/30026; G06F 17/30038; G06N 5/02; G06N 99/005; G06N 3/08; H04N 21/4394; H04N 21/4532; H04N 21/4668; H04N 21/4755
USPC ......... 704/2, 9, 10, 270, 275, 259, 232, 235; 705/14.49; 706/12; 707/769
See application file for complete search history.

(56) References Cited

U.S. PATENT DOCUMENTS

| | | | |
|---|---|---|---|
| 9,734,233 B2* | 8/2017 | Chung | G06F 3/0482 |
| 9,886,432 B2* | 2/2018 | Bellegarda | G06F 17/276 |
| 9,899,019 B2* | 2/2018 | Bellegarda | G10L 15/063 |
| 2008/0195372 A1 | 8/2008 | Chin et al. | |
| 2010/0299199 A1* | 11/2010 | Kang | G06F 17/30026 |
| | | | 705/14.49 |
| 2011/0119047 A1* | 5/2011 | Ylonen | G06F 17/2785 |
| | | | 704/9 |
| 2011/0238495 A1* | 9/2011 | Kang | G06Q 30/02 |
| | | | 705/14.49 |
| 2011/0282644 A1 | 11/2011 | Chin et al. | |
| 2012/0010873 A1 | 1/2012 | Kim et al. | |
| 2012/0284013 A1 | 11/2012 | Chin et al. | |
| 2014/0279747 A1* | 9/2014 | Strassner | G06N 99/005 |
| | | | 706/12 |
| 2014/0303957 A1 | 10/2014 | Lee et al. | |
| 2017/0018272 A1* | 1/2017 | Lee | H04N 21/4394 |
| 2017/0025119 A1* | 1/2017 | Song | G10L 15/04 |

FOREIGN PATENT DOCUMENTS

| | | |
|---|---|---|
| KR | 10-2007-0000921 | 1/2007 |
| KR | 10-2009-0119871 | 11/2009 |

* cited by examiner

DEVICE AND METHOD OF SIMULTANEOUS INTERPRETATION BASED ON REAL-TIME EXTRACTION OF INTERPRETATION UNIT

CROSS-REFERENCE TO RELATED APPLICATION

This application claims priority to and the benefit of Korean Patent Application No. 2016-0116529, filed on Sep. 9, 2016, and Application No. 2017-0115412, filed on Sep. 8, 2017 the disclosure of which is incorporated herein by reference in its entirety.

BACKGROUND

1. Field of the Invention

The present invention relates to a device and method capable of providing a result of real-time automatic interpretation of real-time continuous speech in a situation in which the real-time continuous speech occurs, and more particularly, to a device and method of simultaneous interpretation based on real-time extraction of an interpretation unit capable of providing a result of real-time automatic interpretation of a normal spoken clause and even of a spoken sentence that is a normal spoken clause but is too long, a series of spoken sentences each of which is normal but is too short to correctly be conventionally translated, and a fragment of a sentence that is not a normal sentence, depending on characteristics of real-time speech.

2. Discussion of Related Art

Most automatic translation and automatic interpretation devices being released nowadays assume a sentence as a unit of interpretation/translation, and thus, a basic unit of input speech is a sentence.

According to circumstances, when several sentences are input, translation is performed for each sentence unit after the sentences are broken into sentence units according to simple rules for segmenting sentences.

Consequently, conventional devices aim to faithfully provide accurate translation results for each sentence unit. In most cases, a corresponding sentence unit can faithfully be automatically translated by performing analysis of only the corresponding sentence unit and generating high-quality bilingual text thereof.

In the case of the automatic interpretation and translation devices that perform interpretation or translation for each sentence unit, because users of the devices are aware of automatic interpretation/translation environment, the users speak in a manner that is suitable for automatic interpretation and translation and communicate through the devices such that communication is conducted with sentence units as units of speech.

However, when automatic interpretation/translation is attempted to be performed for real-time continuous speech such as a phone conversation, a lecture, or a presentation, a conventional assumption that a unit of input speech is a sentence often does not make sense.

In the case of the conventional automatic interpretation and translation devices mentioned above, a finish button or pause information is used to finish an input of text. When the finish button or a pause of a predetermined length or longer is generated, it is considered that an input of sentences or speech is finished, and corresponding speech or sentences are considered as sentences to be translated.

However, when interpretation/translation is performed for real-time speech, the finish button cannot be used, and a pause, which is a phonetic feature, is still used as a standard for determining a sentence unit.

As described above, when a pause is used as a standard for determining a translation unit, corresponding speech itself is often not a sentence unit. For example, in some cases, quite long speech consisting of several sentences is spoken in one breath, a single sentence is spoken with multiple breaths, speech is not finished with a sentence, or meaningless interjections are frequently made. In these cases, due to characteristics thereof, a correct translation result cannot be generated using a conventional automatic translation methodology in which translation is performed for each sentence unit.

SUMMARY OF THE INVENTION

The present invention has been made in view of the above related art, and it is an objective of the invention to provide a device and method of simultaneous interpretation based on real-time extraction of an interpretation unit capable of providing a correct interpretation/translation result of continuous speech by recognizing speech that is not a sentence unit, combining pieces of speech including several pauses into a sentence unit, and separating speech consisting of several sentences into sentence units with respect to pieces of speech of a user divided by pause units in consideration of characteristics of real-time speech, without using a pause as a standard for determining units of input of continuous speech of a speaker.

It is another objective of the invention to provide a device and method of simultaneous interpretation based on real-time extraction of an interpretation unit capable of managing one or more pieces of speech and translation results using a context manager.

The objectives of the invention are not limited to those mentioned above and other unmentioned objectives may be clearly understood by those of ordinary skill in the art from the description given below.

To achieve the above objectives, according to an aspect of the present invention, a device of simultaneous interpretation based on real-time extraction of an interpretation unit includes a voice recognition module configured to recognize voice units as sentence units or translation units from vocalized speech that is input in real time, a real-time interpretation unit extraction module configured to form one or more of the voice units into an interpretation unit, and a real-time interpretation module configured to perform an interpretation task for each interpretation unit formed by the real-time interpretation unit extraction module.

According to another aspect of the present invention, a method of simultaneous interpretation based on real-time extraction of an interpretation unit includes recognizing, by a voice recognition module, voice units as sentence units or translation units from vocalized speech that is input in real time, forming, by a real-time interpretation unit extraction module, one or more of the voice units into an interpretation unit, and performing, by a real-time interpretation module, an interpretation task for each interpretation unit formed by the real-time interpretation unit extraction module.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and a method of achieving the same should become clear with embodiments described in detail below with reference to the accompanying drawings. However, the present invention is not limited to embodiments disclosed below and is realized in various other forms. The present embodiments make the disclosure of the present invention complete and are provided to completely inform one of ordinary skill in the art to which the present invention pertains of the scope of the invention. The present invention is defined only by the scope of the claims. Terms used herein are for describing the embodiments and are not intended to limit the present invention. In the specification, a singular expression includes a plural expression unless the context clearly indicates otherwise. "comprises" and/or "comprising" used herein do not preclude the existence or the possibility of adding one or more elements, steps, and operations other than those mentioned.

Figure 1:
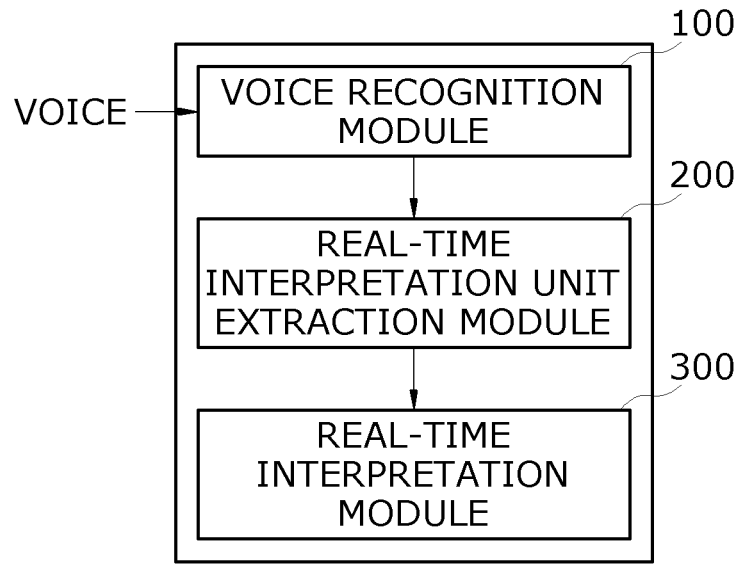
FIG. 1 is a structural diagram for describing a device of simultaneous interpretation based on real-time extraction of an interpretation unit according to an embodiment of the present invention.

Hereinafter, exemplary embodiments of the present invention will be described in detail with reference to the accompanying drawings. FIG. 1 is a structural diagram for describing a device of simultaneous interpretation based on real-time extraction of an interpretation unit according to an embodiment of the present invention. As illustrated in FIG. 1, the device of simultaneous interpretation based on real-time extraction of an interpretation unit according to the embodiment of the present invention includes a voice recognition module 100, a real-time interpretation unit extraction module 200, and a real-time interpretation module 300.

The voice recognition module 100 serves to recognize voice units as sentence units or translation units from vocalized speech that is input in real time. According to the embodiment of the present invention, a voice unit refers to a unit recognized on the basis of a pause from speech in real time.

For example, when real-time speech such as "채피라는 영화를 보시던은 로봇이 어린아이처럼 주변 환경과 상호 작용을 하면서 심지어는 그림책을 보면서 스스로 지식을 습득해 가지고 사람을 닮아 가는 이러한 로봇이 곧 다가올 거라고까지 예견하고 있습니다" is input, the voice recognition module 100 recognizes voice units according to chronological order from the single sentence that is spoken with pauses.

By way of example, the voice recognition module 100 recognizes ten voice units from the above real-time speech. That is, the voice recognition module 100 may recognize "채피라는 영화를 보시던은"(1), "로봇이"(2), "어린아이처럼"(3), "주변 환경과"(4), "상호 작용을 하면서"(5), "심지어는 그림책을 보면서"(6), "스스로 지식을 습득해 가지고"(7), "사람을 닮아 가는 이러한 로봇이"(8), "곧"(9), "다가올 거라고까지 예견하고 있습니다"(10), as voice units.

Then, the real-time interpretation unit extraction module 200 forms one or more of the voice units into an interpretation unit. In the present embodiment, an interpretation unit is a unit formed for interpretation. That is, because a correct translation result is difficult to obtain when a voice unit is translated using conventional automatic interpretation and translation devices, voice units are combined or separated to form interpretation units, which are the units for correct translation, according to the embodiment of the present invention.

Then, the real-time interpretation module 300 performs an interpretation task for each interpretation unit formed by the real-time interpretation unit extraction module 200.

According to the embodiment of the present invention, in a real-time interpretation/translation situation for interpreting real-time continuous speech, a result of real-time automatic interpretation can be provided not only for normal spoken clauses but also for a spoken sentence that is a normal spoken clause but is too long, a series of spoken sentences each of which is normal but is too short to correctly be conventionally translated, and a fragment of a sentence that is not a normal sentence, depending on characteristics of real-time speech.

Figure 2:
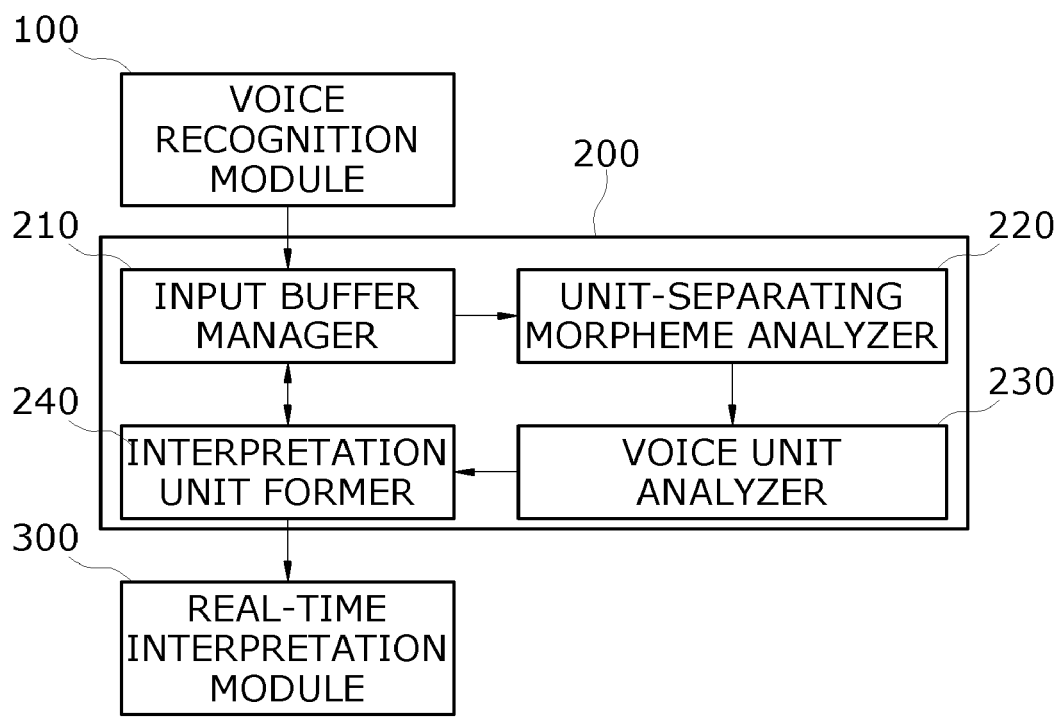
FIG. 2 is a structural diagram for describing a real-time interpretation unit extraction module adopted to the embodiment of the present invention.

FIG. 2 is a structural diagram for describing a real-time interpretation unit extraction module adopted to the embodiment of the present invention. As illustrated in FIG. 2, the real-time interpretation unit extraction module 200 includes an input buffer manager 210, a unit-separating morpheme analyzer 220, a voice unit separator 230, and an interpretation unit former 240.

The input buffer manager 210 stores a voice unit that is input and a remaining voice unit that is not yet included in interpretation due to a previous interpretation unit extraction result.

The unit-separating morpheme analyzer 220 detects morphemes of each of the voice units stored in the input buffer manager 210.

The voice unit separator 230 re-separates the voice units according to a morpheme analysis result of the unit-separating morpheme analyzer 220.

The interpretation unit former 240 forms an interpretation unit by combining a current voice unit and a previous voice unit.

For example, when real-time speech such as "특이한 습성들이있습니다 예를 들면 쥐는 달리기를 하는데, 토끼는 깡총깡총 뛴다든지" is made, "특이한 습성들이있습니다 예를 들면 쥐는"(11), "달리기를 하는데"(12), and "토끼는 깡총깡총 뛴다든지"(13) may be stored as voice units 11, 12, and 13 in the input buffer manager 210.

The voice units stored as above are subjected to morpheme analysis by the unit-separating morpheme analyzer

220. Hereinafter, a voice unit such as "독이한 습성들이 있습니다 예를 들면 쥐는"(11) will be described as an example.

When it is determined from analysis by the unit-separating morpheme analyzer 220 that an adjective, which is an independent morpheme, and a final ending, which is a dependent morpheme, are present, the voice unit separator 230 may determine a corresponding position as a position for separating the voice unit into interpretation units and separate "독이한 습성들이 있습니다 예를 들면 쥐는"(11) into interpretation units, "특이한 습성들이 있습니다"(11-1) and "예를 들면 쥐는"(11-2).

Then, because an adjective, which is an independent morpheme, and a final ending, which is a dependent morpheme, are detected from "특이한 습성들이 있습니다"(11-1), which is separated by the voice unit separator 230, the interpretation unit former 240 combines the voice unit 11-1 with a voice unit that is not yet translated and is stored in the input buffer manager 210 and performs translation. Then, the interpretation unit former 240 provides interpretation unit information to the input buffer manager 210 so that the input buffer manager is able to determine whether to perform interpretation.

"예를 들면 쥐는"(11-2), which is a voice unit, is stored in the input buffer manager 210 and then combined with "달리기를 하는데"(12), which is a subsequent voice unit, and "예를 들면 쥐는 달리기를 하는데" is formed as an interpretation unit.

Figure 3:
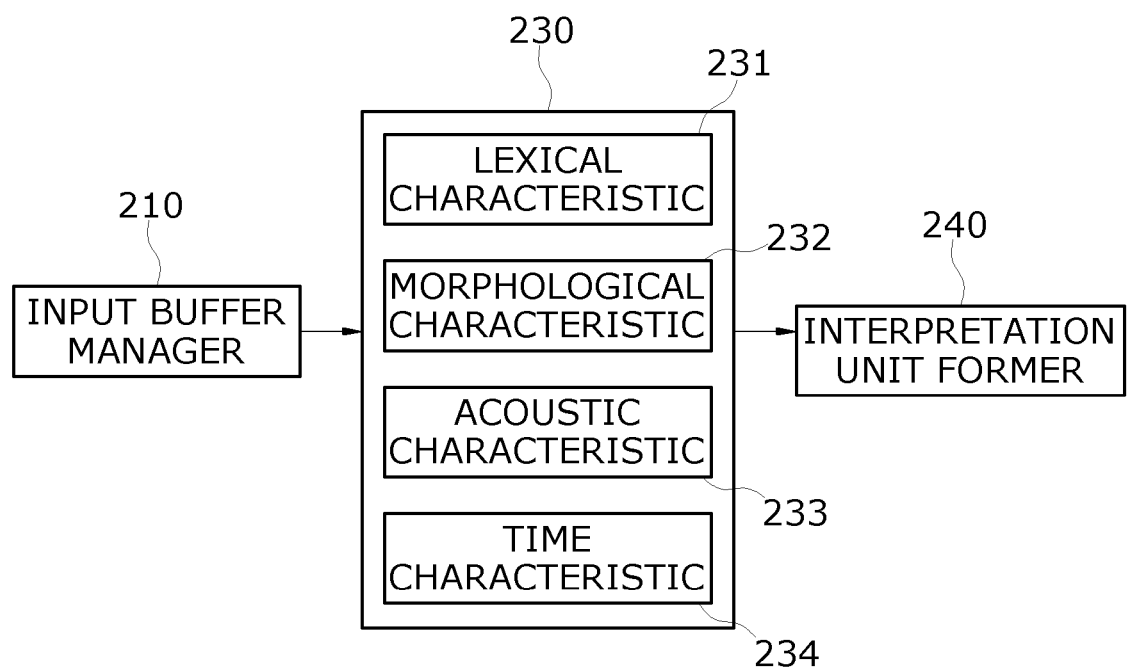
FIG. 3 is a structural diagram for describing a unit separator adopted to the embodiment of the present invention.

As illustrated in FIG. 3, the voice unit separator 230 adopted to the embodiment of the present invention re-separates a current voice unit stored in the input buffer manager 210 on the basis of a lexical characteristic 231, a morphological characteristic 232, an acoustic characteristic 233, and a time characteristic 234.

Here, the lexical characteristic 231 relates to whether a word that can be determined as a beginning of a sentence in a language is present. That is, whether a word having the lexical characteristic 231 is included in a voice unit is determined. For example, in "예를 들면 쥐는"(11-2), "예를 들면," which is a word having the lexical characteristic, is included.

Consequently, when a voice unit that can be separated is present in front of or behind a word having the lexical characteristic 231, the voice unit separator 230 separates the voice unit on the basis of the word having the lexical characteristic 231, and the interpretation unit former 240 forms an interpretation unit on the basis of the voice unit having the lexical characteristic 231.

When a voice unit is separated or an interpretation unit is formed using the lexical characteristic 231 according to the embodiment of the present invention as described above, the coverage may not be high, but a satisfactory result may be obtained in terms of accuracy.

The morphological characteristic 232 is morphological information on a voice unit. Because correct morpheme analysis should be performed even when a unit of input for morpheme analysis used in the voice unit separator 230 is not an interpretation unit, in a case of learning-based morpheme analysis, learning is performed by including a learning sentence instead of a sentence unit, and thus, an analysis result that is more suitable for unit separation can be generated.

According to another embodiment of the present invention, "로봇이 어린아이 처럼 주변 환경과 상호 작용을 하면서" is separated into voice units and subjected to morpheme analysis as "로봇이(21)-로봇/noun+이/postposition, 어린아이처럼(22)-어린아이/noun+처럼/postposition, 주변환경과(23)-주변/noun 환경/noun+과/postposition, 상호 작용을 하면서(24)-상호/noun 작용/noun+을/postposition 하/verb+면서/connective ending." As a result of the morpheme analysis, because a predicate (verb, adjective), which is a morpheme that allows a position for separating a voice unit into interpretation units to be determined, or a final-ending morpheme is not detected from the voice units 21 to 23, the voice units 21 to 23 cannot be determined as interpretation units. However, because a morpheme that corresponds to a verb is detected from the voice unit 24, the voice unit 21 to the voice unit 24 are determined as a single interpretation unit.

Here, because the voice units 21, 22, and 23 do not have a predicate, the voice units 21, 22, and 23 cannot form a sentence on their own on the basis of the morphological characteristic so far, and because translation units are not required to be generated even in terms of time characteristic or acoustic characteristic, the voice units 21, 22, and 23 cannot become translation units.

Consequently, whether the voice units 21, 22, and 23 are to be formed into an interpretation unit is determined after looking at the voice unit 24 that is subsequently input. Because the voice unit 24 includes a verb and thus can be formed into a sentence, the interpretation unit former 240 combines the voice units 21, 22, and 23 that are previously not formed into an interpretation unit and are stored in the input buffer manager 210 with the voice unit 24 and forms "로봇이 어린아이처럼 주변 환경과 상호 작용을 하면서" as an interpretation unit.

According to another embodiment of the present invention, of "특이한 습성들이 있습니다 예를 들면 쥐는"(11) may be stored as a voice unit in the input buffer manager 210.

"특이한 습성들이 있습니다 예를 들면 쥐는"(11), which is the voice unit 11 stored in the input buffer manager 210, includes morphological characteristics such as "있/adjective+습니다/final ending 쥐/noun+는/postposition," which allow the voice unit to be separated into interpretation units. Consequently, "특이한 습성들이 있습니다" (11-1) that has a final ending as a morphological characteristic is determined as an interpretation unit, and "예를 들면 쥐는"(11-2) is subjected to determination of whether it is to be formed into an interpretation unit together with a voice unit that will be stored in the future.

According to still another embodiment of the present invention, with respect toreal-time speech such as "그래서 저희가 뽀로로 영화 여러분 뽀로로 아시나요," the real-time speech may consist of voice units including "그래서 저희가"(31), "뽀로로 영화"(32), and "여러분 뽀로로 아시나요"(33).

When voice unit separation is performed with respect to the speech consisting of the voice units 31 to 33 by reflecting only the morphological characteristic, because the voice units 31 and 32 do not include a predicate, whether to form the voice units 31 and 32 into an interpretation unit is determined after looking at the subsequent voice unit 33. That is, the fact that the predicate "안다" is included in the voice unit 33 may be recognized from morpheme analysis.

In this way, according to still another embodiment of the present invention, like in another embodiment above, the voice units 31, 32, and 33 may be formed into a single interpretation unit.

However, when an interpretation unit is formed only using the morphological characteristic, incorrect interpretation may occur.

That is, because information of the acoustic characteristic 233 such as "여러분" is included in the voice unit 33 among the voice units 31, 32, and 33, the voice units 31, 32, and 33 are preferably formed into an interpretation unit on their own. Consequently, the voice units 31, 32, and 33 are preferably formed as separate interpretation units.

The acoustic characteristic 233 applied to still another embodiment of the present invention preferably includes pause information and prosody and stress information. For example, in the case of pause information, a speaker's intention may be determined from corresponding speech by segmenting a pause length into multiple levels, e.g., ten levels, and checking to which level of pause length the speaker's pause belongs instead of just checking presence of a pause. Prosody or stress information also becomes a key clue in addition to the pause information.

Further, because the time characteristic is one of the fundamental principles of real-time automatic interpretation, it is preferable that time be taken into consideration in determining a translation unit to ensure real-timeness.

Even when a voice unit that is input is unable to be determined as an interpretation unit, in a case in which there is no additional input within a predetermined time or it is difficult to determine an interpretation unit within a predetermined time, preferably, a priority is put on a time factor, an existing voice unit that was previously input is determined as an interpretation unit, and then automatic translation is performed.

Interpretation unit extraction is constructed using a rule-based methodology and a mechanical learning methodology, and a final translation unit may be determined by hybridization between the two methodologies. Here, decisions are made mostly on the basis of the lexical and morphological characteristics using the rule-based methodology, and learning is performed using an interpretation unit separation corpus included in the lexical, morphological, and acoustic characteristics using the mechanical learning methodology. Here, the mechanical learning methodology is not limited to a specific methodology, and any methodology such as a conditional random field (CRF), a support vector machine (SVM), and a deep neural network (DNN) may be the mechanical learning methodology. Also, a translation unit is determined on the basis of time given by a system.

Figure 4:
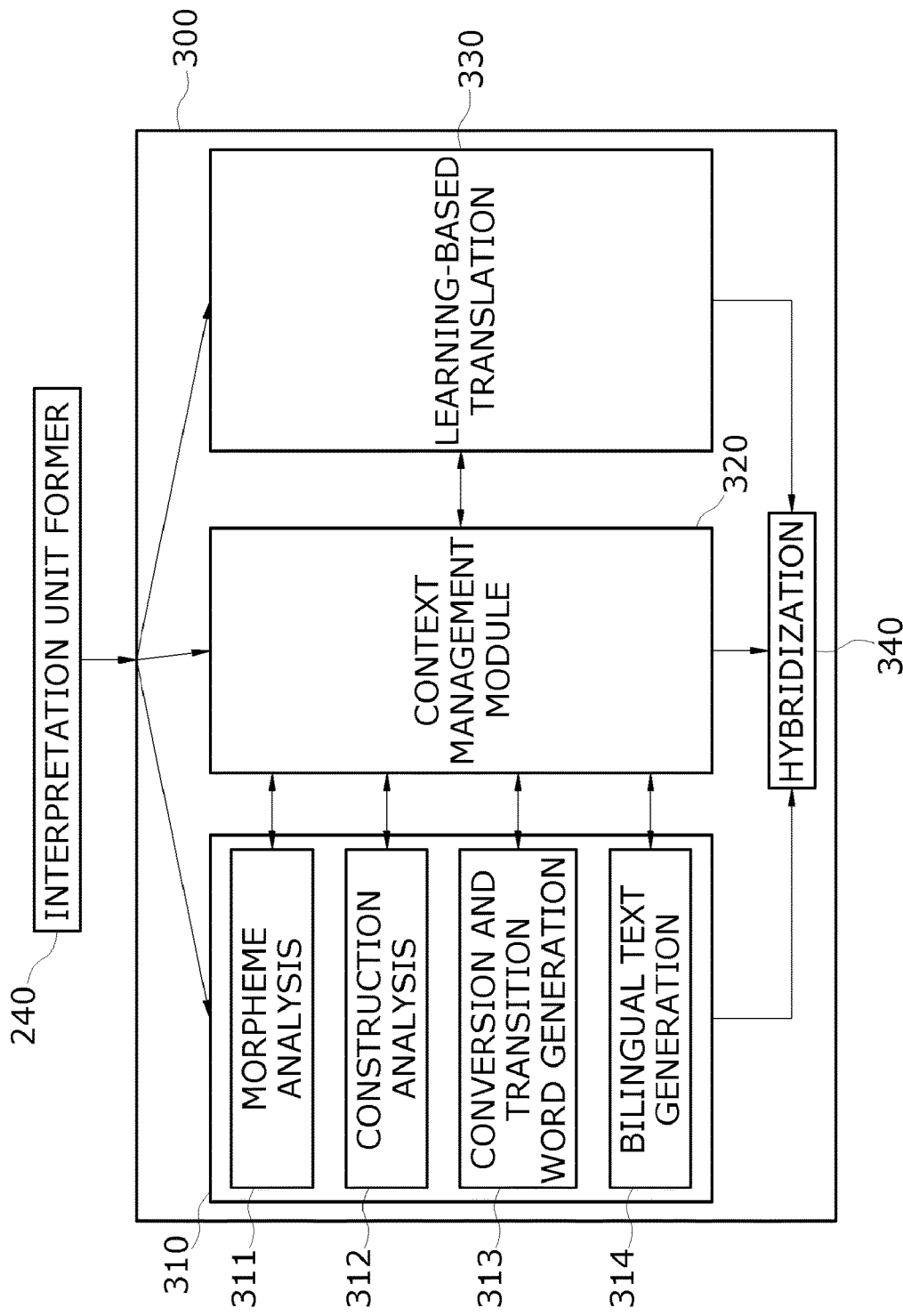
FIG. 4 is a block diagram for describing a real-time interpretation module adopted to the embodiment of the present invention.

FIG. 4 is a block diagram for describing a real-time interpretation module adopted to an embodiment of the present invention. As illustrated in FIG. 4, the real-time interpretation module 300 adopted to the embodiment of the present invention preferably performs translation by using both a module-based method based on modules for morpheme analysis, structure analysis, conversion, and transition word generation and a mechanical learning method using statistical machine translation (SMT), a DNN, and the like.

Thus, an interpretation unit extracted by the real-time interpretation unit extraction module 200 is translated by devices each performing the module-based method and the mechanical learning method of the real-time interpretation module 300.

For example, in the case of conventional interpretation/translation, when "인공지능은, 사람처럼 생각하고, 행동하는 기계를 만들려는 시도였구요." are input as interpretation units, translation is performed such that "인공지능은"(41) is translated as "Artificial intelligence," "사람처럼 생각하고"(42) is translated as "thinks like humans and," and "행동하는 기계를 만들려는 시도였구요"(43) is translated as "it is an attempt to make an acting machine."

However, the conventional interpretation/translation does not accurately reflect the speaker's intention, and a correct translation result can be generated only when the above three translation units are combined into a single sentence.

Conversely, according to the present invention, when "인공지능은"(41), "사람처럼 생각하고"(42), and "행동하는 기계를 만들려는 시도였구요"(43) are input as voice units, the voice units 41, 42, and 43 are formed into an interpretation unit, "인공지능은 사람처럼 생각하고 행동하는 기계를 만들려는 시도였구요."

Accordingly, the interpretation unit, "인공지능은 사람처럼 생각하고 행동하는 기계를 만들려는 시도였구요," can be translated as "Artificial intelligence is an attempt to make a machine which thinks and acts like humans," which reflects the speaker's intention.

The final translated result can be output by voice and on a screen. Although a translation result output by voice cannot be modified later, a translation result output on a screen can be modified later.

According to yet another embodiment of the present invention, the device of simultaneous interpretation may further include a context management module configured to store all previous interpretation units and results of analyzing and generating morphemes/structures and translation results related to the interpretation units.

According to the context management module adopted to yet another embodiment of the present invention, in addition to an advantage of being able to modify an existing translation result later through context, there is an advantage in that a correct translation result can be generated by modifying an existing error using context for each of the modules.

For example, in a case of "대전에서 사신 분 손들어보세요?", "사신" is ambiguously interpreted as "사다" or "살다."

However, according to the context management module, when "지금도 대전에 살고 계시는 분 손들어보세요?" that includes "살/verb+고/ending" is input as a subsequent interpretation unit, context may be grasped from "살고," i.e., the word that means "살다," and the previous word "사신" may be translated as "살다."

In this way, according to yet another embodiment of the present invention, there is an advantage in that a translation error that occurred with a previous sentence can be modified using a subsequent sentence.

Figure 5:
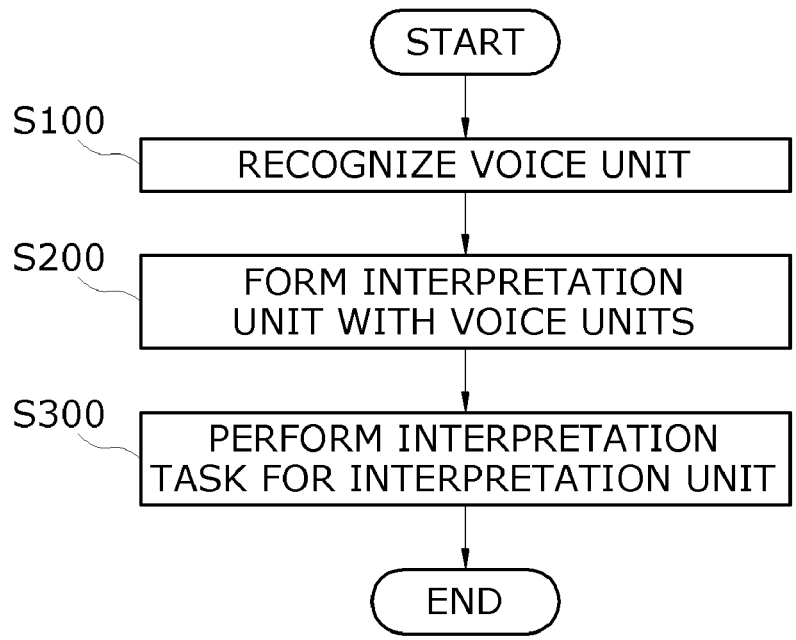
FIG. 5 is a flowchart for describing a method of simultaneous interpretation based on real-time extraction of an interpretation unit according to the embodiment of the present invention.

Hereinafter, a method of simultaneous interpretation based on real-time extraction of an interpretation unit according to an embodiment of the present invention will be described with reference to FIG. 5.

First, the voice recognition module 100 recognizes voice units as sentence units or translation units from vocalized speech that is input in real time (S100). According to the embodiment of the present invention, the voice units are recognized on the basis of a pause.

For example, when real-time voice saying "채피라는 영화를 보시던은 로봇이 어린아이처럼 어린아이처럼 주변 환경과 상호 지어는 그림책을 보면서 스스로 지식을 습득해 가 지고 사람을 닮아 가는 이러한 로봇이 곧 다가올 거라고까지 예견하고 있습니다" is input, the voice recognition module 100 recognizes voice units according to chronological order from the single sentence that is spoken with pauses.

For example, the voice recognition module 100 recognizes ten voice units.

That is, the voice recognition module 100 may recognize "채피라는 영화를 보시던은"(1), "로봇이"(2), "어린아이처럼"(3), "주변 환경과"(4), "상호 작용을 하면서"(5), "지어는 그림책을 보면서"(6), "스스로 지식을 습득해 가지고"(7), "사람을 닮아 가는 이러한 로봇이"(8), "곧"(9), "다가올 거라고까지 예견하고 있습니다"(10) as voice units.

Then, the real-time interpretation unit extraction module 200 forms one or more of the voice units into an interpretation unit (S200). That is, because a correct translation result is difficult to obtain when a voice unit is translated using conventional automatic interpretation and translation devices, voice units are combined or separated to form units for correct translation according to the embodiment of the present invention.

Then, the real-time interpretation module 300 performs an interpretation task for each interpretation unit formed by the real-time interpretation unit extraction module 200 (S300).

According to the embodiment of the present invention, in a real-time interpretation/translation situation for interpreting real-time continuous speech, a result of real-time automatic interpretation can be provided not only for normal spoken clauses but also for a spoken sentence that is a normal spoken clause but is too long, a series of spoken sentences each of which is normal but is too short to correctly be conventionally translated, and a fragment of a sentence that is not a normal sentence depending on characteristics of real-time speech.

Figure 6:
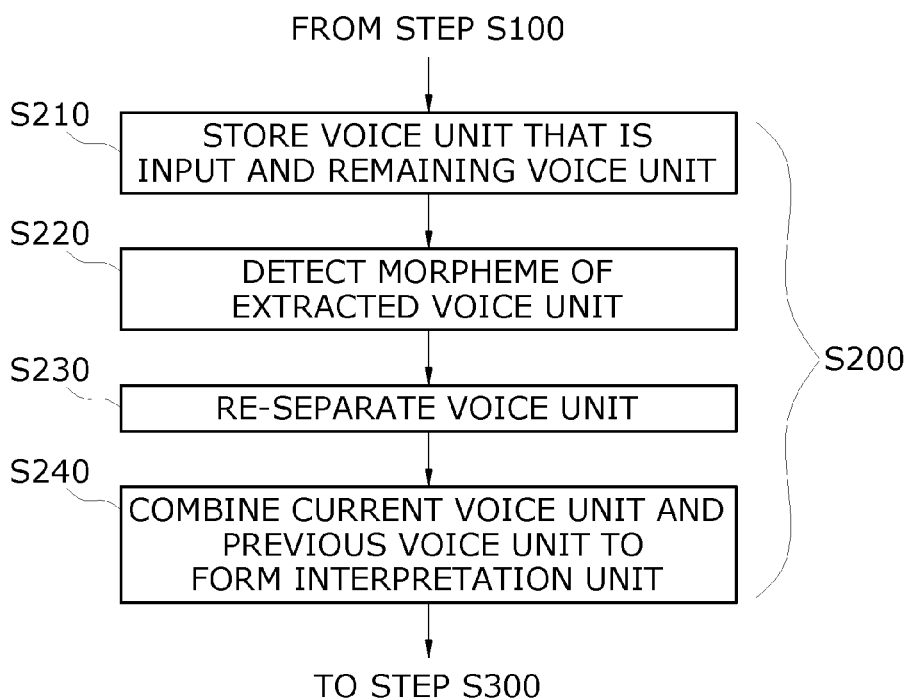
FIG. 6 is a flowchart for describing a real-time interpretation unit extraction module adopted to the embodiment of the present invention.

Hereinafter, a detailed operational process of the forming of the interpretation unit with the voice units (S200) adopted to the embodiment of the present invention will be described with reference to FIG. 6.

First, the input buffer manager 210 stores a voice unit that is input and a remaining voice unit that is not yet included in sentences to be translated due to a previous interpretation unit extraction result (S210).

Then, the unit-separating morpheme analyzer 220 detects morphemes of each of the extracted voice units (S220).

Then, the voice unit separator 230 re-separates the voice units according to a morpheme analysis result of the unit-separating morpheme analyzer 220 (S230).

Then, the interpretation unit former 240 forms an interpretation unit by combining a current voice unit and a previous voice unit (S240).

For example, when real-time speech such as "특이한 습성들이 있습니다 예를 들면 쥐는 달리기를 하는데, 토끼는 깡총깡총 뛴다든지" is made, "특이한 습성들이 있습니다 예를 들면 쥐는"(11), "달리기를 하는데"(12), and "토끼는 깡총깡총 뛴다든지"(13) may be stored as voice units 11, 12, and 13 in the input buffer manager 210.

The voice units stored as above are subjected to morpheme analysis by the unit-separating morpheme analyzer 220. Hereinafter, a voice unit such as "특이한 습성들이 있습니다 예를 들면 쥐는"(11) will be described as an example.

Consequently, when it is determined from analysis by the unit-separating morpheme analyzer 220 that an adjective, which is an independent morpheme, and a final ending, which is a dependent morpheme, are present, the voice unit separator 230 may determine a corresponding position as a position for separating the voice unit into interpretation units and separate "특이한 습성들이 있습니다 예를 들면 쥐는"(11) into interpretation units, "특이한 습성들이 있습니다"(11-1) and "예를 들면 쥐는"(11-2).

Then, because an adjective, which is an independent morpheme, and a final ending, which is a dependent morpheme, are detected from "특이한 습성들이 있습니다"(11-1), which is separated by the voice unit separator 230, the forming of the interpretation unit (S240) includes combining the voice unit 11-1 with a voice unit that is previously not translated and is stored in the input buffer manager 210 and performing translation. Then, the interpretation unit former 240 provides interpretation unit information to the input buffer manager 210 so that the input buffer manager is able to determine whether to perform interpretation.

The re-separating of the voice units (S230) adopted to the embodiment of the present invention preferably includes re-separating a voice unit stored in the input buffer manager 210 on the basis of the lexical characteristic 231, the morphological characteristic 232, the acoustic characteristic 233, and the time characteristic 234.

Here, the lexical characteristic 231 relates to whether a word that can be determined as a beginning of a sentence in a language is present. That is, whether a word having the lexical characteristic 231 is included in a voice unit is determined. For example, in "예를 들면 쥐는"(11-2), "예를 들면," which is a word having the lexical characteristic, is included.

Consequently, when a voice unit that can be separated is present in front of or behind a word having the lexical characteristic 231, the voice unit separator 230 separates the voice unit on the basis of the word having the lexical characteristic 231, and the interpretation unit former 240 forms an interpretation unit on the basis of the voice unit having the lexical characteristic 231.

When a voice unit is separated or an interpretation unit is formed using the lexical characteristic 231 according to the embodiment of the present invention as described above, the coverage may not be high, but a satisfactory result may be obtained in terms of accuracy.

The morphological characteristic 232 is morphological information on a voice unit. Because correct morpheme analysis should be performed even when a unit of input for morpheme analysis used in the voice unit separator 230 is not an interpretation unit, in a case of learning-based morpheme analysis, learning is performed by using a learning sentence instead of a sentence unit, and thus, an analysis result that is more suitable for unit separation can be generated.

According to another embodiment of the present invention, when "로봇이 어린아이처럼 주변 환경과 상호 작용을 하면서" is input, the speech is separated into voice units and subjected to morpheme analysis as "로봇이(21)– 로봇/noun+이/postposition, 어린아이처럼(22)–어린아이/noun+처럼/postposition, 주변 환경과(23)–주변/noun 환경/noun+과/postposition, 상호 작용을 하면서(24)–상호/noun 작용/noun+을/postposition 하/verb+면서/connective ending." As a result of the morpheme analysis, because a predicate (verb, adjective), which is a morpheme that allows a position for separating a voice unit into interpretation units to be determined, or a final-ending morpheme is not detected from the voice units 21 to 23 and a verb is detected from the voice unit 24, the voice unit 21 to the voice unit 24 are determined as a single interpretation unit.

Here, because the voice units 21, 22, and 23 do not have a predicate, the voice units 21, 22, and 23 cannot form a sentence on their own on the basis of the morphological characteristic so far, and because translation units are not required to be generated even in terms of time characteristic or acoustic characteristic, the voice units 21, 22, and 23 cannot become translation units.

Consequently, whether the voice units 21, 22, and 23 are to be formed into an interpretation unit is determined after looking at the voice unit 24 that is subsequently input. Because the voice unit 24 includes a verb, the interpretation unit former 240 combines the voice units 21, 22, and 23 that are previously not formed into an interpretation unit and are stored in the input buffer manager 210 with the voice unit 24 and forms "로봇이 어린아이처럼 주변 환경과 상호 작용 을 하년서" as an interpretation unit.

According to another embodiment of the present invention, "특이한 습성들이 있습니다 예를 들면 쥐는"(11) will be described as an example of a voice unit.

"특이한 습성들이 있습니다 예를 들면 쥐는"(11), which is the voice unit 11 stored in the input buffer manager 210, includes morphological characteristics such as "있/adjective+습니다/final ending 쥐/noun+는/postposition" which allow the voice unit to be separated into interpretation units.

Consequently, "특이한 습성들이 있습니다"(11-1) that has a final ending as a morphological characteristic is formed into an interpretation unit, and "예를 들면 쥐는"(11-2) is subjected to determination of whether it is to be formed into an interpretation unit together with a voice unit that will be stored in the future.

According to still another embodiment of the present invention, when real-time speech such as "그래서 지희가 뽀로로 영화 여러분 뽀 로로 아시나요," is input, the real-time speech may be separated into voice units including "그래서 지희가"(31), "뽀로로 영화"(32), and "여러분 뽀로로 아 시나요"(33).

When voice unit separation is performed with respect to the speech consisting of the voice units 31 to 33 by reflecting only the morphological characteristic, because the voice units 31 and 32 do not include a predicate, whether to form the voice units 31 and 32 into an interpretation unit is determined after looking at the subsequent voice unit 33. The fact that the predicate "알다" is included in the voice unit 33 may be recognized from morpheme analysis.

Consequently, according to still another embodiment of the present invention, like in another embodiment above, the voice units 31, 32, and 33 may be formed into a single interpretation unit.

However, when an interpretation unit is formed only using the morphological characteristic, incorrect interpretation may occur.

That is, because information of the acoustic characteristic 233 such as "여러분" is included in the voice unit 33 among the voice units 31, 32, and 33, the voice units 31, 32, and 33 are preferably formed into an interpretation unit on their own.

Consequently, the voice units 31, 32, and 33 are preferably formed as separate interpretation units.

The acoustic characteristic 233 applied to still another embodiment of the present invention preferably includes pause information and prosody and stress information. For example, in the case of pause information, a speaker's intention may be determined from corresponding speech by segmenting a pause length into multiple levels, e.g., ten levels, and checking to which level of pause length the speaker's pause belongs instead of just checking presence of a pause. Prosody or stress information also becomes a key clue in addition to the pause information.

Further, because the time characteristic is one of fundamental principles of real-time automatic interpretation, it is preferable that time be taken into consideration in determining a translation unit to ensure real-timeness.

Even when a voice unit that is input is unable to be determined as an interpretation unit, in a case in which there is no additional input within a predetermined time or it is difficult to determine an interpretation unit within a predetermined time, preferably, a priority is put on a time factor, an existing voice unit that was previously input is determined as an interpretation unit, and then automatic translation is performed.

The performing of the interpretation task for each interpretation unit adopted to the embodiment of the present invention preferably includes performing translation by using both a module-based method based on modules for morpheme analysis, structure analysis, conversion, and transition word generation and a mechanical learning method using SMT, a DNN, and the like.

Thus, an interpretation unit extracted by the real-time interpretation unit extraction module 200 is translated by devices each performing the module-based method and the mechanical learning method of the real-time interpretation module 300.

For example, in the case of conventional interpretation/translation, when "인공지능은 사람처럼 생각하고 행동하는 기계를 만들려는 시도였구요." are input as interpretation units, translation is performed such that "구요"(41) is translated as "Artificial intelligence," "사람처럼 생각하고" (42) is translated as "thinks like humans and," and "행동하는 기계를 만들려는 시도였구요"(43) is translated as "it is an attempt to make an acting machine."

However, the conventional interpretation/translation does not accurately reflect the speaker's intention, and a correct translation result can be generated only when the above three translation units are combined into a single sentence.

Conversely, according to the present invention, when "인공지능은"(41), "사람처럼 생각하고"(42), and "행동하는 기계를 만들려는 시도였구요"(43) are input as voice units, the voice units 41, 42, and 43 are formed into an interpretation unit, "인공지능은 사람처럼 생각하고 행동하는 기계를 만들려는 시도였구요."

Accordingly, the interpretation unit, "인공지능은 사람처럼 생각하고 행동하는 기계를 만들려는 시도였구요," can be translated as "Artificial intelligence is an attempt to make a machine that thinks and acts like humans," which reflects the speaker's intention.

The final translated result can be output by voice and on a screen. Although a translation result output by voice cannot be modified later, a translation result output on a screen can be modified later.

The performing of the interpretation task for each interpretation unit includes storing all previous interpretation units and results of analyzing and generating morphemes/ structures and translation results related to the interpretation units.

According to the performing of the interpretation task for each interpretation unit adopted to yet another embodiment of the present invention, in addition to an advantage of being able to modify an existing translation result later through context, there is an advantage in that a correct translation result can be generated by modifying an existing error using context even for each of the modules.

For example, in a case of "대전에서 사신 분 손들어보세요?", "사신" is ambiguously interpreted as "사다" or "살다".

However, according to the performing of the interpretation task for each translation unit, when "지금도 대전에 살고 계시는 분 손들어 보세요?" that includes "살/verb+고/ending" is input as a subsequent interpretation unit, context may be grasped from "살고," i.e., the word that means "살다," and the previous word "사신" may be translated as "살다."

In this way, according to yet another embodiment of the present invention, there is an advantage in that a translation error that occurred with a previous sentence can be modified using a subsequent sentence.

According to the present invention, according to an embodiment of the present invention, in a real-time interpretation/translation situation for interpreting real-time continuous speech, a result of real-time automatic interpretation can be provided not only for normal spoken clauses but also for a spoken sentence that is a normal spoken clause but is too long, a series of spoken sentences each of which is normal but is too short to correctly be conventionally translated, and a fragment of a sentence that is not a normal sentence depending on characteristics of real-time speech.

The configuration of the present invention has been described in detail with reference to the accompanying drawings, but this is merely an example, and various modifications and changes are possible within the scope of the technical idea of the present invention by one of ordinary skill in the art to which the present invention pertains. Therefore, the scope of the present invention is not limited to the above-described embodiments and are defined by the claims below.

What is claimed is:

1. A device of simultaneous interpretation based on real-time extraction of an interpretation unit, the device comprising:
    a voice recognition module configured to recognize voice units as sentence units or translation units from vocalized speech that is input in real time;
    a real-time interpretation unit extraction module configured to form one or more of the voice units into an interpretation unit; and
    a real-time interpretation module configured to perform an interpretation task for each interpretation unit formed by the real-time interpretation unit extraction module.

2. The device of claim 1, wherein the real-time interpretation unit extraction module includes:
    an input buffer manager configured to store a voice unit that is input and a remaining voice unit that is not yet included in sentences to be translated due to a previous interpretation unit extraction result;
    a unit-separating morpheme analyzer configured to detect morphemes of each of the voice units;
    a voice unit separator configured to re-separate the voice units according to a morpheme analysis result of the unit-separating morpheme analyzer; and
    an interpretation unit former configured to form an interpretation unit by combining a current voice unit and a previous voice unit.

3. The device of claim 2, wherein the voice unit separator re-separates a voice unit stored in the input buffer manager on the basis of a lexical characteristic, a morphological characteristic, an acoustic characteristic, and a time characteristic.

4. The device of claim 3, wherein the lexical characteristic is a characteristic of determining whether a word that is able to be determined as a beginning of a sentence in a language is present.

5. The device of claim 3, wherein the morphological characteristic is a characteristic of determining whether a predicate or a final ending is included after acquiring a morpheme analysis result related to the voice unit.

6. The device of claim 3, wherein the acoustic characteristic is a characteristic related to pause information and prosody and stress information.

7. The device of claim 1, wherein the real-time interpretation module performs translation by using both a module-based method based on modules for morpheme analysis, structure analysis, conversion, and transition word generation and a mechanical learning method using statistical machine translation (SMT), a deep neural network (DNN), and the like.

8. The device of claim 7, further comprising a context management module configured to store all previous interpretation units and results of analyzing and generating morphemes/structures and translation results related to the interpretation units.

9. A method of simultaneous interpretation based on real-time extraction of an interpretation unit, the method comprising:
    recognizing, by a voice recognition module, voice units as sentence units or translation units from vocalized speech that is input in real time;
    forming, by a real-time interpretation unit extraction module, one or more of the voice units into an interpretation unit; and
    performing, by a real-time interpretation module, an interpretation task for each interpretation unit formed by the real-time interpretation unit extraction module.

10. The method of claim 9, wherein the forming of the interpretation unit with the voice units includes:
    storing, by an input buffer manager, a voice unit that is input and a remaining voice unit that is not yet included in sentences to be translated due to a previous interpretation unit extraction result;
    detecting, by a unit-separating morpheme analyzer, morphemes of each of the voice units;
    re-separating, by a voice unit separator, the voice units according to a morpheme analysis result of the unit-separating morpheme analyzer; and
    forming, by an interpretation unit former, an interpretation unit by combining a current voice unit and a previous voice unit.

11. The method of claim 10, wherein the re-separating of the voice units includes re-separating a voice unit stored in the input buffer manager on the basis of a lexical characteristic, a morphological characteristic, an acoustic characteristic, and a time characteristic.

12. The method of claim 11, wherein the lexical characteristic is a characteristic of determining whether a word that is able to be determined as a beginning of a sentence in a language is present.

13. The method of claim 11, wherein the morphological characteristic is a characteristic of determining whether a predicate or a final ending is included after acquiring a morpheme analysis result related to the voice unit.

14. The method of claim 11, wherein the acoustic characteristic is a characteristic related to pause information and prosody and stress information.

15. The method of claim 9, wherein the performing of the interpretation task for each interpretation unit includes performing translation by using both a module-based method based on modules for morpheme analysis, structure analysis, conversion, and transition word generation and a mechanical learning method using SMT, a DNN, and the like.

16. The method of claim 15, wherein the performing of the interpretation task for each interpretation unit includes storing all previous interpretation units and results of analyzing and generating morphemes/structures and translation results related to the interpretation units.

\* \* \* \* \*